(12) United States Patent
George

(10) Patent No.: US 10,154,132 B2
(45) Date of Patent: *Dec. 11, 2018

(54) METHOD, APPARATUS AND SYSTEM FOR CALL LEG SELECTION

(71) Applicant: BLACKBERRY LIMITED, Waterloo (CA)

(72) Inventor: Richard John George, Waterloo (CA)

(73) Assignee: BLACKBERRY LIMITED, Waterloo, Ontario (*) Notice: Subject to any disclaimer, the term of this patent is extended or adjusted under 35 U.S.C. 154(b) by 436 days.

This patent is subject to a terminal disclaimer.

(21) Appl. No.: 14/858,216

(22) Filed: Sep. 18, 2015

(65) Prior Publication Data

US 2016/0014268 A1 Jan. 14, 2016

Related U.S. Application Data

(63) Continuation of application No. 12/109,657, filed on Apr. 25, 2008.

(60) Provisional application No. 60/914,407, filed on Apr. 27, 2007.

(51) Int. Cl.
*H04M 3/02* (2006.01)
*H04M 3/42* (2006.01)
*H04M 3/436* (2006.01)
*H04M 3/46* (2006.01)

(52) U.S. Cl.
CPC ......... *H04M 3/02* (2013.01); *H04M 3/42238* (2013.01); *H04M 3/42382* (2013.01); *H04M 3/436* (2013.01); *H04M 3/465* (2013.01); *H04M 2203/2011* (2013.01)

(58) Field of Classification Search
None
See application file for complete search history.

(56) References Cited

U.S. PATENT DOCUMENTS

| | | | |
|---|---|---|---|
| 8,687,788 B2* | 4/2014 | George | H04M 3/42238 379/211.02 |
| 2007/0047698 A1* | 3/2007 | Kafka | H04M 3/533 379/88.22 |
| 2007/0165827 A1* | 7/2007 | Worsham | H04M 3/42229 379/221.08 |
| 2007/0171816 A1* | 7/2007 | Pfleging | H04L 43/0852 370/225 |
| 2008/0147470 A1* | 6/2008 | Johri | G06Q 10/06 379/265.11 |

(Continued)

OTHER PUBLICATIONS

George, Richard John, "Method, Apparatus and System for Call Leg Selection", U.S. Appl. No. 12/109,657, filed Apr. 25, 2008.

(Continued)

*Primary Examiner* — Antim G Shah
(74) *Attorney, Agent, or Firm* — Perry + Currier Inc.

(57) ABSTRACT

A method, apparatus and system for call leg selection is provided. In an embodiment, a call manger is provided which is connected to telephones that have the same telephone number. When the call manager receives an incoming call identifying that telephone number, the call manager sends a query to each of the telephones inquiring as to which telephone should receive the call. Depending on the response, the call manager will route the call to the appropriate one of the telephones.

9 Claims, 7 Drawing Sheets

(56) References Cited

U.S. PATENT DOCUMENTS

2008/0212767 A1* 9/2008 Charlson ............ H04M 3/5191
379/265.09

OTHER PUBLICATIONS

George, Richard John, "Method, Apparatus and System for Call Leg Selection", U.S. Appl. No. 13/536,428, filed Jun. 28, 2012, now U.S. Pat. No. 8687788, dated Apr. 1, 2014.
Communication pursuant to Article 94(3) EPC (Examination Report) dated Jul. 10, 2017, by EPO, re European Patent Application No. 08748190.

* cited by examiner

METHOD, APPARATUS AND SYSTEM FOR CALL LEG SELECTION

CROSS REFERENCE TO RELATED APPLICATIONS

The present application is a continuation of U.S. patent application Ser. No. 12/109,657, filed Apr. 25, 2008, the entire-content of which is incorporated herein by reference.

FIELD

The present specification relates generally to telecommunications and more specifically relates to a method, apparatus and system for call leg selection.

BACKGROUND

Some telephony devices are already capable of supporting multiple active numbers. This capability will be referred to herein as multi-line support or support for multiple lines. However, multi-line support is not available in all telephony devices, and even those that do support multiple lines may not manage those lines particularly well.

DETAILED DESCRIPTION OF THE EMBODIMENTS

An aspect of this specification provides a system for selecting a call leg comprising a call manager connected to a telephony network for receiving an incoming call destined for a telephone number. The call manager is configured to maintain a list of telephones each having the telephone number. The call manager is further configured to send a query to each of the telephones for identifying which of the telephones is designated to receive the incoming call. The call manager is further configured to receive responses to the query and based on the responses to route the incoming call to a designated one of the telephones.

Figure 1:
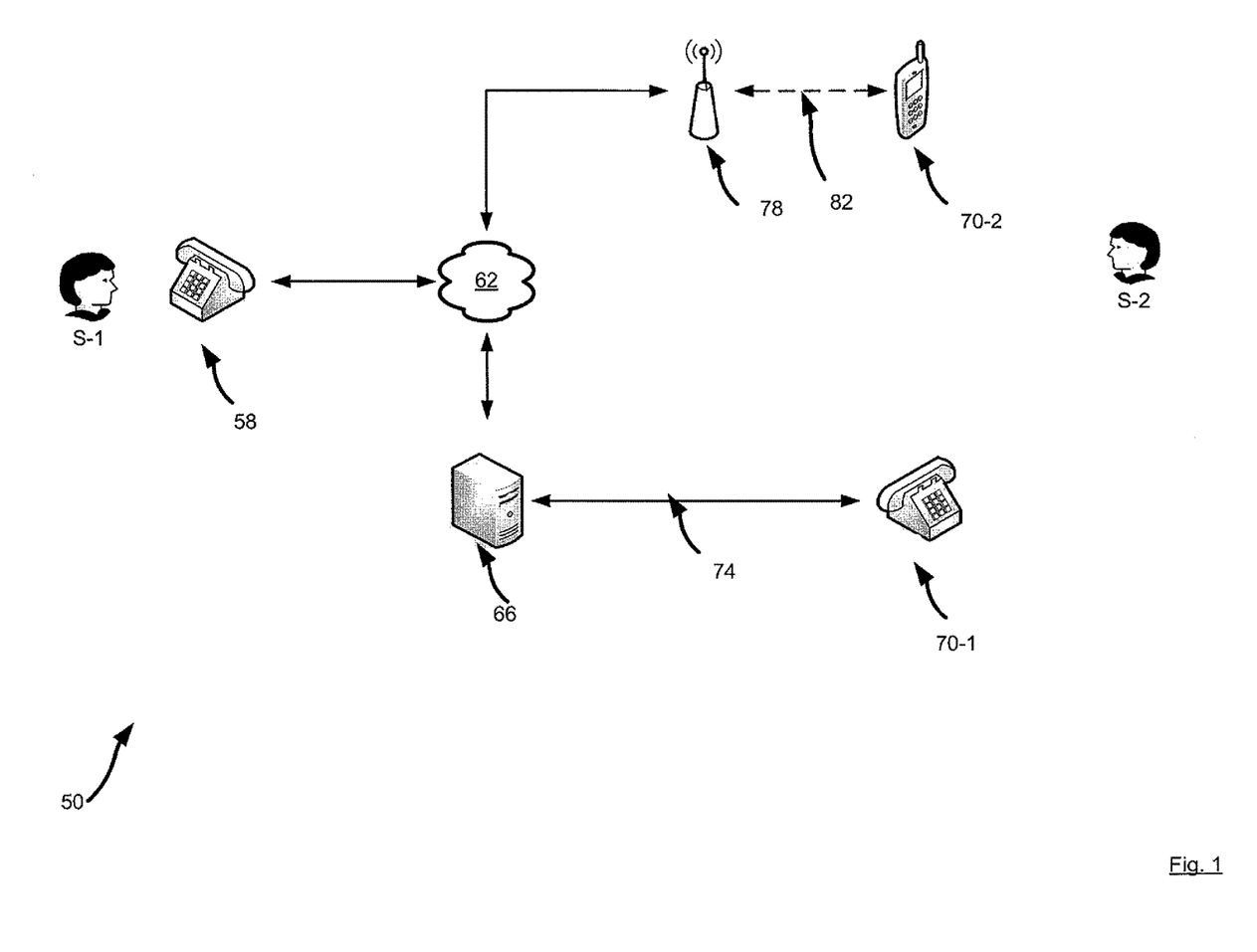
FIG. 1 shows a system for call leg selection in accordance with an embodiment.

Referring now to FIG. 1, a system for call leg selection is indicated generally at 50. System 50 comprises a first telephone 58 that is used by a first subscriber S-1. Telephone 58 is connected to a telephony network 62. Telephone 58 and network 62 can be based on any known or future contemplated telephony infrastructure including, the public switched telephone network ("PSTN"), and/or a packet switched network such as a cellular telephony network and/or the Internet, and/or combinations thereof.

Telephony network 62, in turn, is connected to a call manager 66. Call manager 66 is also connected to a phone such as a telephone 70-1 via a link 74. Telephone 70-1 can be an Internet telephone depending on the nature of link 74. However, this is a non-limiting example and indeed link 74 can be based on a wide area network, (or even network 62 itself or portions thereof) or a local area network, whether or not wired or wireless, and combinations thereof. Telephone 70-1 thus represents an extension that is managed by call manager 66. Telephone 70-1 is operable to conduct telephony calls, whether incoming or outgoing, over network 62.

It should be understood that call manager 66 can be embodied in the form of a server or other computing device. Such a server can be based on a typical computing architecture comprising an arrangement of one or more central processing units that connect to one or more memory units in the form of i) volatile storage (e.g. random access memory), or non-volatile storage (e.g. a hard disc drive, read only memory) or both. Such a server typically includes one or more network interfaces for connecting the processor to network 62. The components of the server are typically interconnected by a bus and executing appropriate operating systems and system software to achieve the functionalities described herein. Those skilled in the art will now recognize other electronic circuitry configurations, now known or future contemplated, for call manager 66 are contemplated.

Telephony network 62 is also connected to a wireless base station 78 which is operable to carry telephony calls associated with network 62 on behalf of a wireless telephone 70-2 via wireless link 82. Wireless link 82 is based on any known or future contemplated wireless telephony links including the Global System for Mobile communications ("GSM"), Code Division Multiple Access ("CDMA") and/or IEEE 802.11 and/or Bluetooth™ and/or variants thereof and/or combinations thereof and/or successors thereto. Wireless base station 78 is typically one of a plurality of base stations found as part of a wireless network operated by a wireless telephony carrier.

In a present embodiment, telephones 70-1 and 70-2 (collectively, telephones 70 and generically, telephone 70) can each have the same telephone number, referred to herein as XXX-XXXX. Alternatively a shared line configuration or similar may be used to identify the phones as part of a set of phones that should be alerted when one of the phones in the set is alerted. Accordingly, when subscriber S-1 dials XXX-XXXX into telephone 58, either telephone 70 can be used to answer that call in accordance with the teachings herein.

Call manager 66 represents itself to network 62 as being the destination for phone number XXX-XXXX (such that a call initiated at telephone 58 for XXX-XXXX (will be routed through network 62 until it reaches call manager 66. Call manager 66, in turn, is configured to route such an incoming call to either telephone 70 in accordance with the teachings herein. Call manager 66 maintains a configuration that indicates that number XXX-XXXX (is associated with both telephones 70, associating the number XXX-XXXX (with a device address associated with each telephone 70. Such a device address can be based on, for example, the International Mobile Equipment Identity ("IMEI") associated with telephone 70-2. Where telephone 70-1 is an IP phone, then the device address for telephone 70-1 can be the Media Access Control ("MAC") address for telephone 70-1. Other types of device addresses will now occur to those skilled in the art. Alternatively, the device address can simply be a mapping between telephone numbers. In other words, assume that telephone 70-1 has the telephone number XXX-XXXX (while telephone 70-2 has another telephone number YYY-YYYY. In this case, call manager 66 can then maintain a mapping configuration that indicates that XXX-XXXX (is mapped directly to telephone 70-1 via telephone number XXX-XXXX (and is also mapped indirectly to telephone 70-2 by mapping telephone number XXX-XXXX (to telephone number YYY-YYYY.

Those skilled in the art will also now recognize that call manager 66 can be based on the infrastructure of a private branch exchange ("PBX"), although other functionally similar infrastructures such as Ascendent Mobility, or Grand-Central are contemplated.

Telephones 70 are also each operable to exchange signaling information with call manager 66. Such signaling information can be delivered and received using any desired protocol, but in a present embodiment the Session Initiation Protocol ("SIP") is employed. In a present embodiment, call manager 66 is configured, upon receipt on an incoming call for XXX-XXXX, to send signaling information to each telephone 70 to query as to which telephone 70 should be used to actually receive the call. Likewise, telephones 70 are each configured to use signaling information that is responsive to the query from call manager 66 which indicates which telephone 70 should be used to actually receive the call.

In general, it should now be understood that telephones 70 can be embodied in the form of a computing device or other suitable electronic hardware. An exemplary computing device can be based on a typical computing architecture comprising of an arrangement of one or more central processing units that connect to one or more memory units in the form of i) volatile storage (e.g. random access memory), or non-volatile storage (e.g. a hard disc drive, read only memory) or both. Such a computing device typically includes one or more network interfaces for connecting the processor to network 62. Such a computing device also includes input devices such as a microphone and a keypad, and output devices such as an earpiece or speaker and a display. The components of the computing device are typically interconnected by a bus and executing appropriate operating systems and system software to achieve the functionalities described herein. Those skilled in the art will now recognize other electronic circuitry configurations, now known or future contemplated, for telephone 70 are contemplated.

Figure 2:
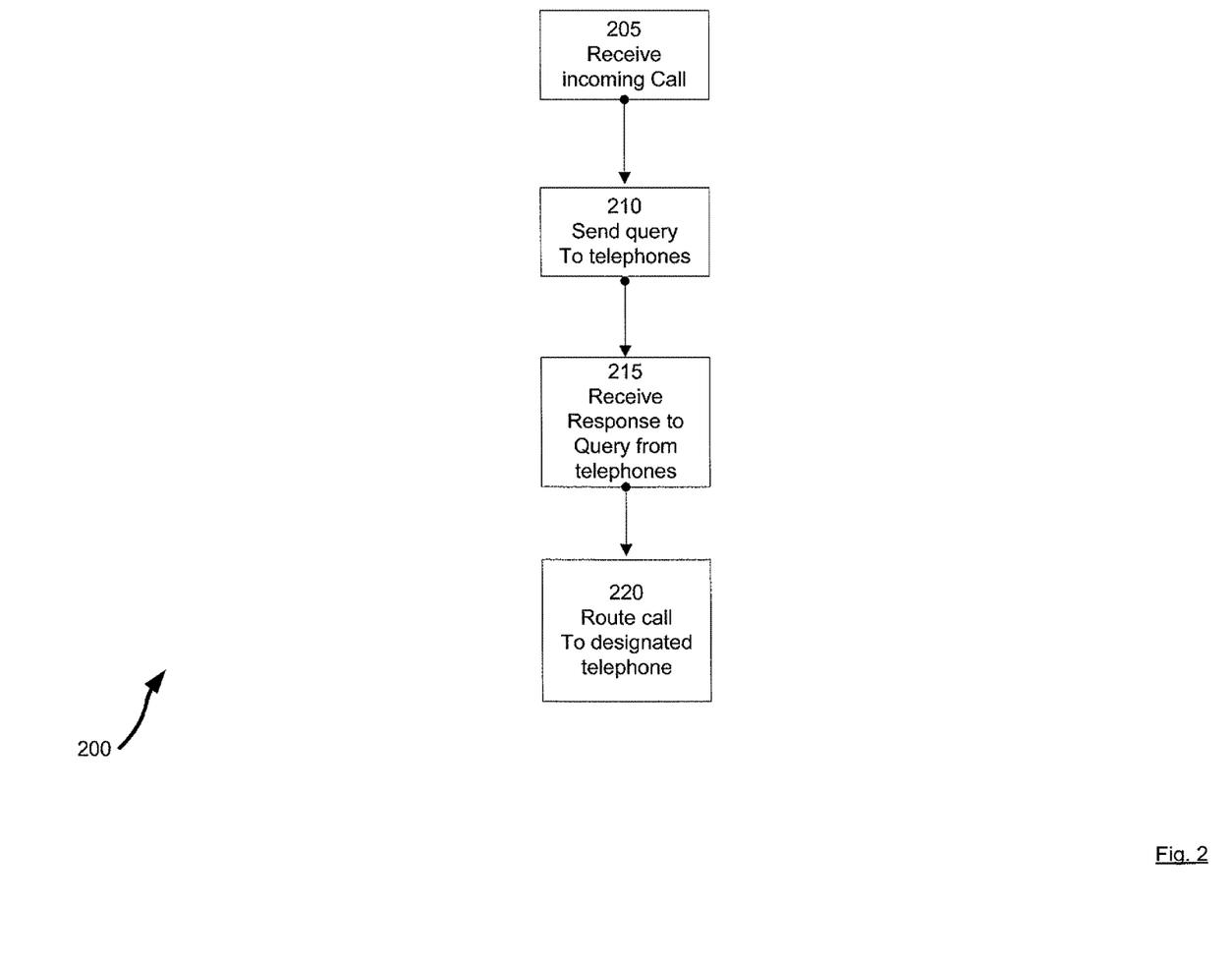
FIG. 2 shows a flow-chart depicting a method for call leg selection in accordance with another embodiment.

Referring now to FIG. 2, a method for selecting call leg is shown in the form of a flow-chart and indicated generally at 200. Method 200 can be performed using system 50 but it should be understood that method 200 can be performed using other systems. However, to help further assist in understanding method 200 and system 50, method 200 will be explained assuming it is performed using system 50. Of particular note is that in system 50, method 200 can be performed on by a server used to implement call manager 66.

Figure 3:
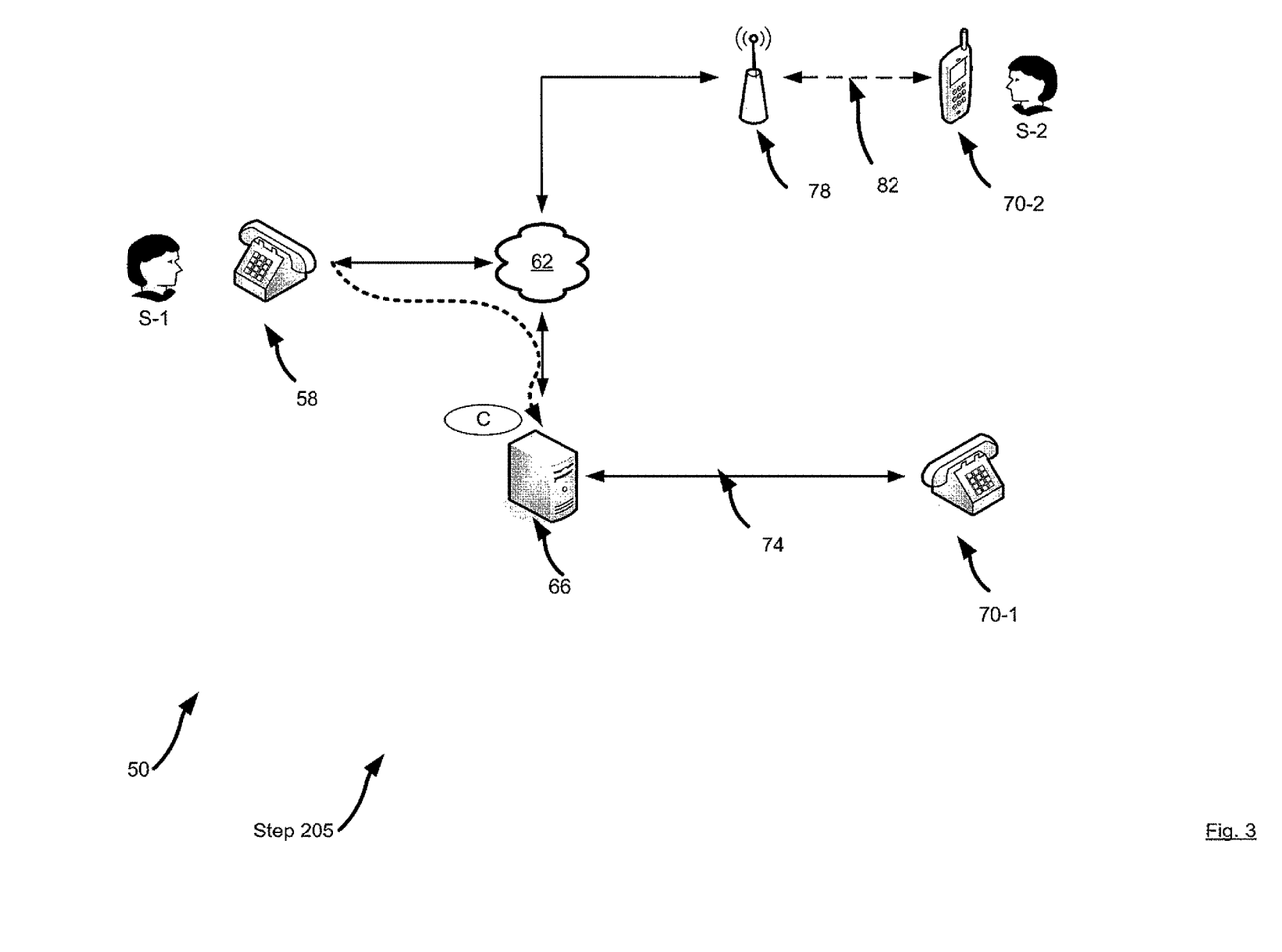
FIG. 3 shows the system of FIG. 1 during exemplary performance of step 205 of the method of FIG. 2.

Beginning first at step 205, an incoming call is received. For example, assume that subscriber S-1 uses telephone 58 to dial the number XXX-XXXX. The call initiated at telephone 58 will be routed through network 62 to call manager 66 in the usual manner. Step 205 is represented in FIG. 3 as a call for the number XXX-XXXX, represented as an oval indicated at C, is shown as originating from telephone 58 and being routed through network 62 and arriving at server 66.

Figure 4:
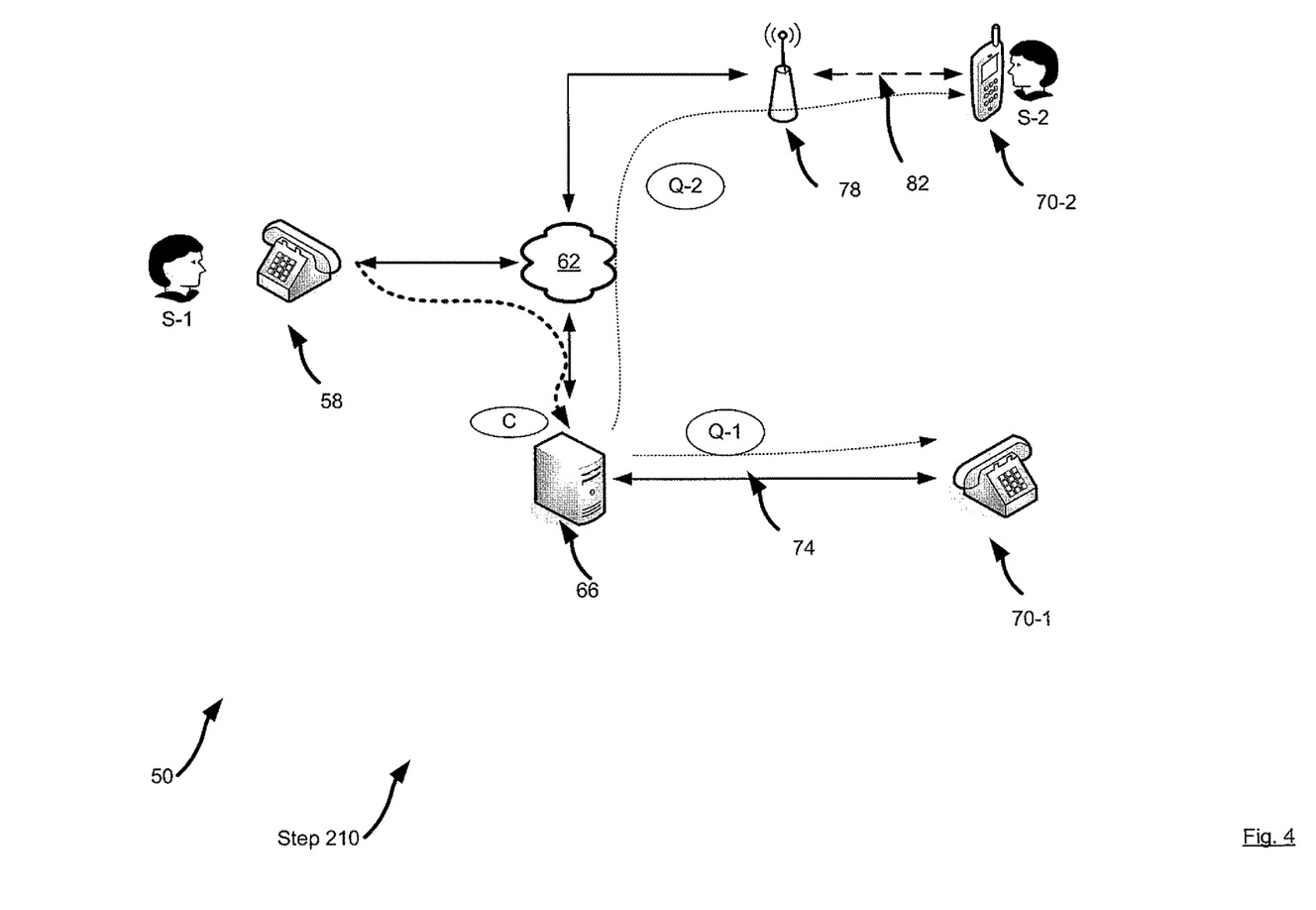
FIG. 4 shows the system of FIG. 1 during exemplary performance of step 210 of the method of FIG. 2.

Next, at step 210, a query is sent to each of the telephones associated with the incoming call. The query is sent using the previously-discussed signaling protocols that are known to both call manager 66 and telephones 70. Manager 66 utilizes the previously-discussed device addresses for each telephone 70 in order to route the respective queries. Each query asks its destination telephone 70 as to which telephone should receive the incoming call C. Step 210 is represented in FIG. 4, as a first query Q-1 is sent to telephone 70-1 via link 74, and a second query Q-2 is sent to telephone 70-2 via base station 78. While queries Q are being sent, call C is held at manager 66, perhaps continuing to generate a ring-back for subscriber S-1 at telephone 58.

Figure 5:
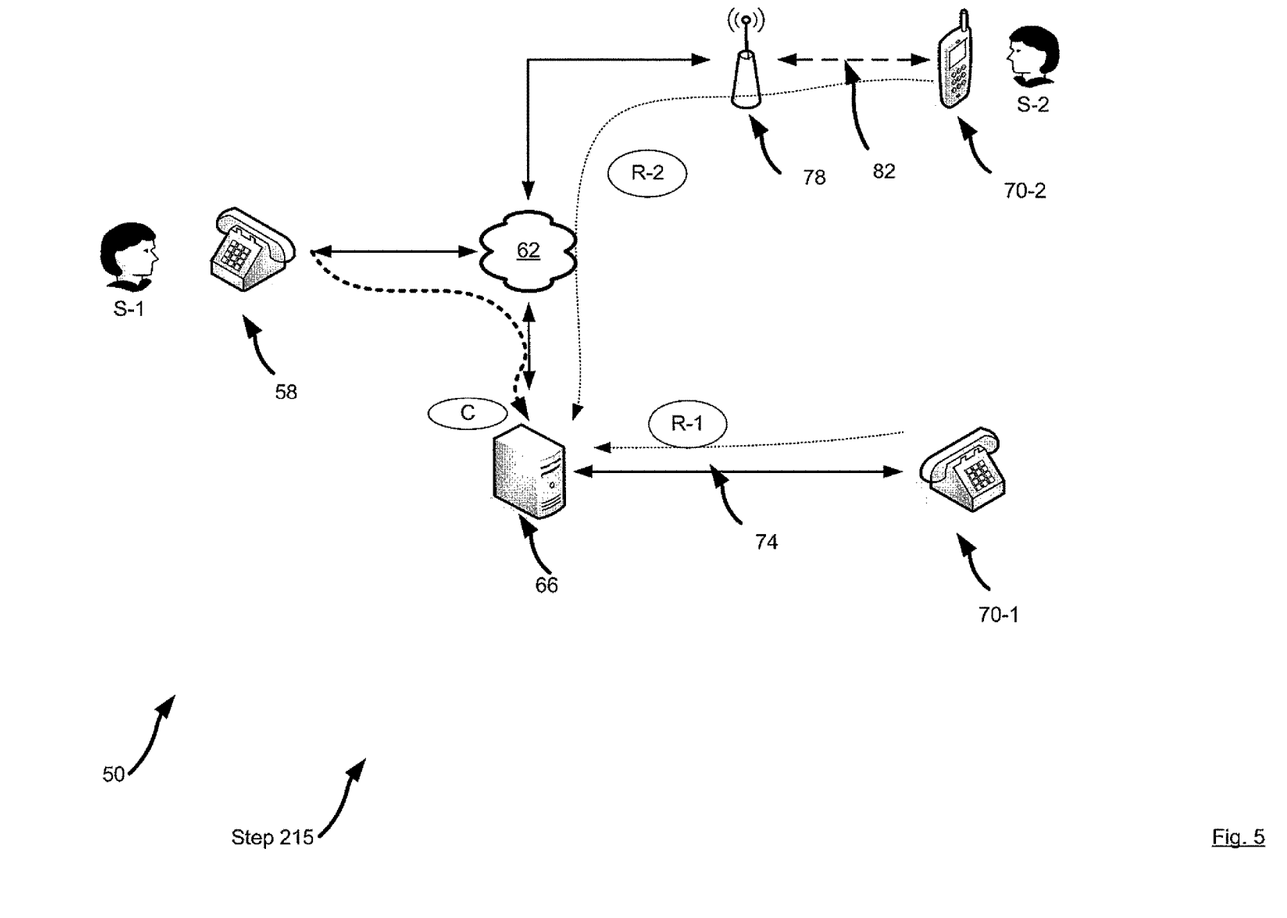
FIG. 5 shows the system of FIG. 1 during exemplary performance of step 215 of the method of FIG. 2.

Next, at step 215, a response to each query is sent from each of the telephones to manager 66. Like the query, the response is sent using the previously-discussed signaling protocols that are known to both call manager 66 and telephones 70. One of the responses indicates to manager 66 that the telephones 70 sending the response is the telephone which should receive the incoming call C. For example, assume that telephone 70-2 has been set to receive the incoming call C. In this example, telephone 70-2 will send a response at step 215 that indicates that telephone 70-2 should receive call C, and telephone 70-1 will send a response indicating that telephone 70-1 will not receive call C. Step 215 is represented in FIG. 5, as a first response R-1 is sent from telephone 70-1 via link 74 to manager 66, and a second response R-2 is sent from telephone 70-2 via base station 78 to manager 66. In general, it will now be understood that in the present embodiment telephones 70 are configured to be responsive to queries as contemplated in steps 210 and 215.

Figure 6:
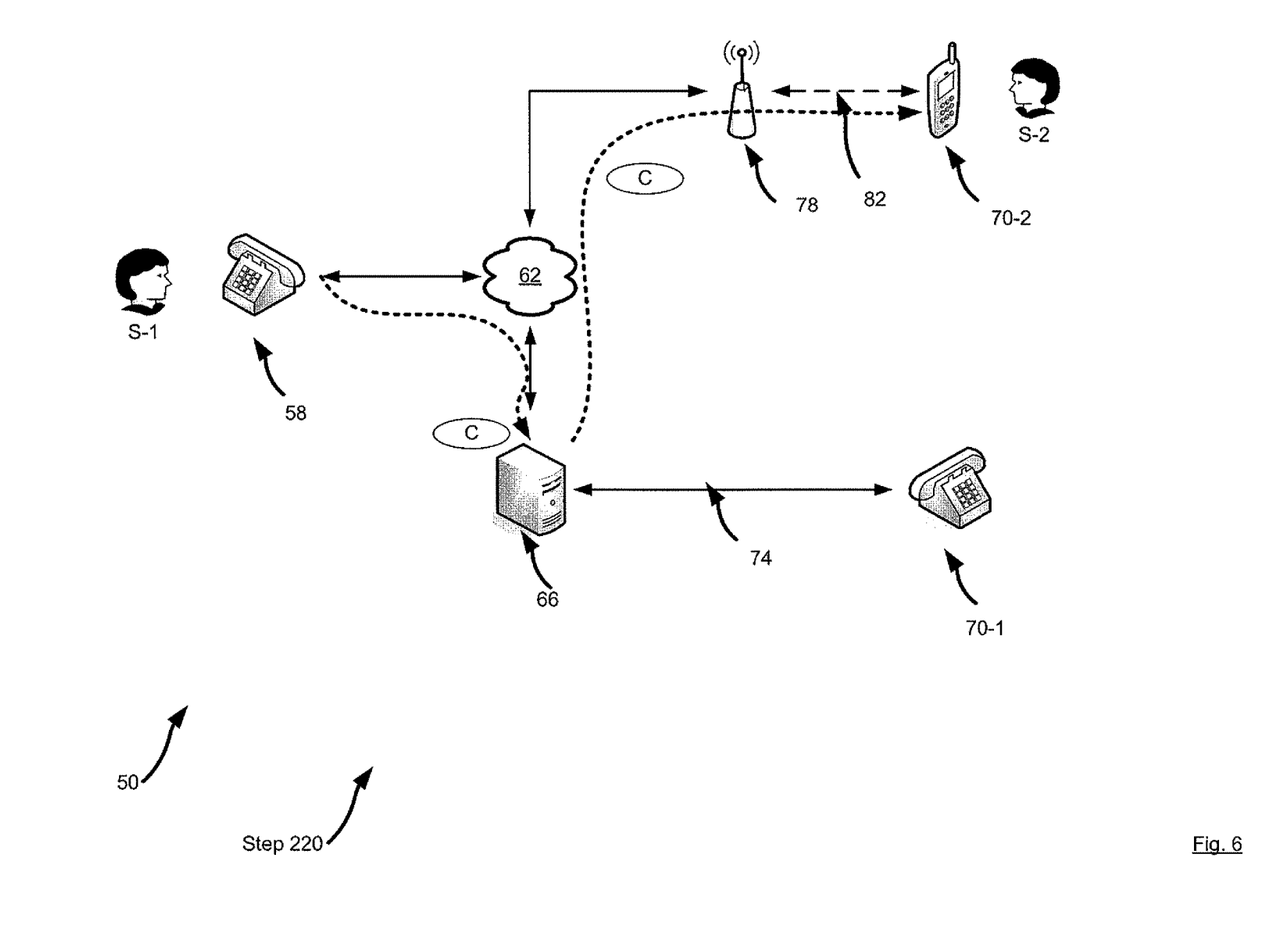
FIG. 6 shows the system of FIG. 1 during exemplary performance of step 220 of the method of FIG. 2.

Next, at step 220, the call is routed to the telephone as designated from the response received at step 215. Thus, manager 66 will cause call C to be transferred to the appropriate telephone 70. Step 220 is represented in FIG. 6, as call C is shown being routed from manager 66 to telephone 70-2, thereby establishing a connection from telephone 58 to telephone 70-2, such that subscriber S-1 can speak with subscriber S-2.

It is to be understood that the means by which a particular telephone 70 is designated as being set to receive incoming calls is not particularly limited. Likewise, mechanisms can be provided, as desired, to ensure that only one telephone 70 is set to receive incoming calls, and likewise to ensure that responses R to queries Q made at step 215 will only have one response R that indicates that call C should be routed to a given telephone 70. That is to say, system 50 can be configured so that only one response R indicates where call C should be routed.

Exemplary mechanisms include a manual process whereby subscriber S-2 enters a command into either telephone 70-1 or telephone 70-2 to indicate that one or the other is designated for receiving incoming calls.

Another mechanism can be based on detected characteristics of a particular link between a particular telephone 70 and the call manager 66. For example, assume that subscriber S-2 is actually physically proximal to both telephones 70, in which case the subscriber S-2 may have no preference for which device to use. Therefore, each query Q can be based on determining characteristics of respective links—such characteristics can include quality of service (QoS) or financial cost of a particular link or combinations thereof. Thus, for example, if link 82 was of particularly poor quality, or very costly, then response R-2 can indicate such poor characteristics. Likewise, response R-1 may indicate that link 74 is neither costly and/or has high QoS characteristics. Accordingly, manager 66 can elect to route call C to telephone 70-1 instead of telephone 70-2.

It should be understood that the decision by manager 66 to route a particular call can also be based on presence of a particular telephone 70. That is to say that manager 66 can elect not to even perform method 200 when only one telephone 70 is actually detected as present by manger 66 for actually receiving calls, thereby causing manager 66 to route calls C to that one telephone 70 by default.

It should also be understood that manager 66 and each telephone 70 can still perform traditional call forwarding, whereby assuming that call C is initially routed to telephone 70-2 as a result of performance of method 200, but there is no answer at telephone 70-2, then manager 66 can be configured to route call C to telephone 70-1 after the attempt to route call C to telephone 70-2.

Those skilled in the art will recognize that different latencies in the connections between telephones 70 and manager 66 can cause each query Q to arrive at its respective telephone 70 at different times. Responses R are of course subject to similar latencies. Such latencies can be one advantage of certain embodiments discussed herein, as those latencies could cause an error condition if manager 66 attempted to "ring" both telephones 70 simultaneously. An example error condition is that, assume that link 74 is faster than link 78, and assume both telephones were caused to "ring" in response to call C by manager 66. In this case, if telephone 70-1 was answered, telephone 70-2 may continue to "ring" due to the latency of link 82, as manager 66 attempts to signal to telephone 70-2 to discontinue ringing.

It is also to be understood that in other embodiments, method 200 can be performed even in the absence of an incoming call for the purposes of determining where the call should be routed when a subsequent call is received. For example, manager 66 can perform method 200 periodically, starting at step 210, for telephones 70 and store a telephone 70 as a designated phone based on the results. The designation can be based on the result of the last performance of method 200, or on a history of the results of several previous performances, such as an average of QoS determinations made as a result of several previous performances of method 200. Subsequently, when a call is received for telephones 70 at manager 66, the call can be routed to the appropriate telephone 70 based on the stored designation.

Alternatively, in other embodiments, subscriber S-1 can initiate the designation of a telephone 70 as the recipient of incoming calls by sending a manual instruction, through a telephone 70, to manager 66 indicating such a designation, even in the absence of an incoming call. Manager 66 can store such a designation, and use the stored designation in routing any subsequent calls received for telephones 70.

In yet other embodiments, a designation determined as a result of performing method 200 as a result of an incoming phone call can also be stored for future use. In further embodiments, a stored designation can serve as a backup designation in the event the performance of method 200 fails to produce a designation at the time of the reception of the call. For example, where the manager 66 does not receive a response to a query at step 215, the stored designation can be used to route the call instead.

Figure 7:
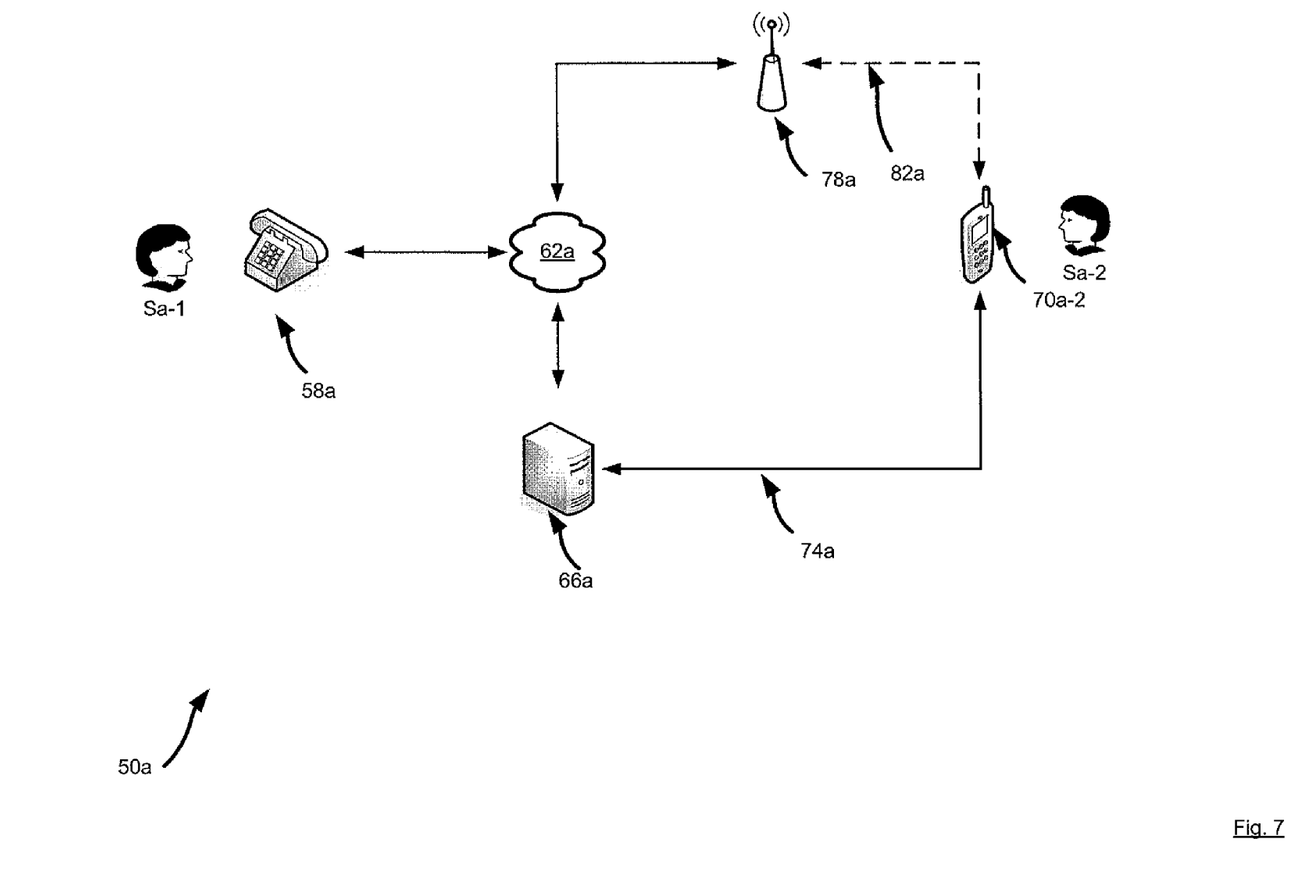
FIG. 7 shows a system for call leg selection in accordance with another embodiment.

Referring now to FIG. 7, another system for call leg selection is indicated at 50a. System 50a includes many of the same components as system 50, and like components bear like reference characters except followed by the suffix "a". Of note, in system 50a telephone 70-1 is omitted and telephone 70-2 is connected to manager 66 by both link 82a and link 74a. When method 200 is performed on system 50a, the queries sent at step 210 are both sent to telephone 70-2, however, one query is sent via link 82a and the second via link 74a. Responses sent at step 215 can be sent via either link 82a or via link 74a. The responses sent at step 215 indicate which of link 82a and link 74a are preferred. Step 220, when performed on system 50a, routes the call to telephone 70-2, but sends the call via the route that is identified at step 215.

While the foregoing describes certain embodiments, it will now be apparent that combinations, subsets, and/or variations of those embodiments are contemplated.

The invention claimed is:

1. A server for selecting a call leg comprising:
   an interface for connecting to a telephony network;
   a processor connected to the interface via a bus; the processor configured to receive an incoming telephone call via the interface; the incoming call destined for a telephone number;
   a memory connected to the processor via the bus; the memory configured to maintain an electronic list of a plurality of telephones each associated with the telephone number; each of the telephones connectable to the telephony network;
   the processor further configured to:
      send a query via the interface to each of the plurality of telephones for identifying which of the telephones is designated to receive the incoming call;
      when more than one response to the query received from the plurality of telephones via the interface indicates a designation of the respective telephone to receive the incoming call, upon receipt of the incoming call: hold the incoming call; determine a first and a second of the designated telephones by prioritizing the designated telephones based on characteristics of respective links between the telephones and the processor; and route the incoming call to the first one of the designated telephones; and
      when no answer is received at the first one of the designated telephones, route the incoming call to the second one of the designated telephones.

2. The server of claim 1, the processor being configured to send the query periodically.

3. The server of claim 1, the processor being configured to prioritize the designated telephones based on a quality of service of a link between the server and each of the designated telephones.

4. A method for selecting a call leg in a server comprising an interface; a processor and a memory, the method comprising:
   maintaining an electronic list of a plurality of telephones each associated with the telephone number in the memory;
   sending a query via the interface to each of the plurality of telephones for identifying which of the telephones is designated to receive the incoming call;
   when more than one response to the query received from the plurality of telephones via the interface indicates a designation of the respective telephone to receive the incoming call, upon receipt of the incoming call: holding the incoming call; determining a first and a second of the designated telephones by prioritizing the designated telephones based on characteristics of respective links between the telephones and the processor; and routing the incoming call to the first one of the designated telephones; and
   when no answer is received at the first one of the designated telephones, route the incoming call to the second one of the designated telephones.

5. The method of claim 4, further comprising sending the query periodically.

6. The method of claim 4, further comprising prioritizing the designated telephones based on a quality of service of a link between the server and each of the designated telephones.

7. A non-transitory computer-readable medium storing a computer program, wherein execution of the computer program is for selecting a call leg in a server comprising an interface, a processor and a memory, by:
- maintaining an electronic list of a plurality of telephones each associated with the telephone number in the memory;
- sending a query via the interface to each of the plurality of telephones for identifying which of the telephones is designated to receive the incoming call;
- when more than one response to the query received from the plurality of telephones via the interface indicates a designation of the respective telephone to receive the incoming call, upon receipt of the incoming call: holding the incoming call; determining a first and a second of the designated telephones by prioritizing the designated telephones based on characteristics of respective links between the telephones and the processor; and routing the incoming call to the first one of the designated telephones; and
- when no answer is received at the first one of the designated telephones, route the incoming call to the second one of the designated telephones.

8. The non-transitory computer readable medium of claim 7, wherein execution of the computer program is further for sending the query periodically.

9. The non-transitory computer readable medium of claim 7, wherein execution of the computer program is further for prioritizing the designated telephones based on a quality of service of a link between the server and each of the designated telephones.

* * * * *